United States Patent
Heidemann et al.

[11] Patent Number: 5,748,348
[45] Date of Patent: May 5, 1998

[54] OPTICAL COMMUNICATION SYSTEM FOR CABLE-TELEVISION SIGNALS AND FOR SUBSCRIBER-ASSIGNED SIGNALS

[75] Inventors: Rolf Heidemann, Tamm; Gustav Veith, Bad Liebenzell; Jurgen Otterbach, Leonberg, all of Germany

[73] Assignee: Alcatel N.V., Rijswijk, Netherlands

[21] Appl. No.: 554,272

[22] Filed: Nov. 6, 1995

[30] Foreign Application Priority Data

Oct. 31, 1994 [DE] Germany .................. 44 38 942.6

[51] Int. Cl.[6] ............................................. H04J 14/02
[52] U.S. Cl. ..................................... 359/125; 359/166
[58] Field of Search ............................ 359/118, 124, 359/125, 137, 164, 167, 173, 168, 182, 188, 166; 370/481, 482

[56] References Cited

U.S. PATENT DOCUMENTS

| | | | |
|---|---|---|---|
| 4,441,180 | 4/1984 | Schüssler | 359/125 |
| 4,481,621 | 11/1984 | Schmack et al. | 359/125 |
| 4,525,834 | 7/1985 | Schenkel et al. | 359/125 |
| 4,545,048 | 10/1985 | Hauk et al. | 359/125 |
| 4,748,689 | 5/1988 | Mohr | 359/125 |
| 4,763,326 | 8/1988 | Krick | 359/125 |
| 5,128,790 | 7/1992 | Heidemann et al. | 359/132 |
| 5,142,532 | 8/1992 | Adams | 370/94.1 |
| 5,162,937 | 11/1992 | Heidemann et al. | 359/124 |
| 5,181,106 | 1/1993 | Sutherland | 358/86 |
| 5,189,673 | 2/1993 | Burton et al. | 370/110.1 |
| 5,191,456 | 3/1993 | Sutherland et al. | 359/118 |
| 5,202,780 | 4/1993 | Fussgänger | 359/125 |
| 5,204,767 | 4/1993 | Nakata et al. | |
| 5,251,053 | 10/1993 | Heidemann | 359/145 |
| 5,303,229 | 4/1994 | Withers et al. | 370/58.1 |
| 5,337,175 | 8/1994 | Ohnsorge | 359/125 |

FOREIGN PATENT DOCUMENTS

| | | |
|---|---|---|
| 3044657 | 7/1982 | Germany . |
| 3437772 | 4/1986 | Germany . |
| 4001039 | 7/1991 | Germany . |
| 4104084 | 8/1992 | Germany . |
| 4116660 | 11/1992 | Germany . |

OTHER PUBLICATIONS

"Optoelektronik in der Teilnehmeranschlussleitung", L. Adnet, et al, Elektrisches Nachrichtenwessen (Alcatel) 4th Quarter 1992, pp. 58–65.

*Primary Examiner*—Wellington Chin
*Assistant Examiner*—Rafael Barares
*Attorney, Agent, or Firm*—Ware, Fressola, Van Der Sluys & Adolphson LLP

[57] ABSTRACT

In an optical communication system in which cable-television signals and subscriber-assigned telecommunication signals are transmitted over a passive optical network (4, 5) to at least one optical network termination (6), each optical network termination (6) requires two optical-to-electrical transducers. An optical network termination (6) is disclosed which requires only one optical-to-electrical transducer (24). The system has two transmitting devices (1, 2) which each transmit a respective optical signal ($O_{TV}$, $O_D$). In the second transmitting device (2), a second electric signal ($S_D$), whose energy occupies a second frequency band (FB2), is processed in such a way that the energy is concentrated in a subband lying outside the first frequency band (FB1) of a first electric signal ($S_{TV}$). The optical-to-electrical transducer (24) in the optical network termination (6) converts the received optical signals ($O_{TV}$, $O_D$) to an electric multiplex signal ($E_{MUX}$), from which the two electric signals ($S_{TV}$, $S_D$) are recovered.

16 Claims, 3 Drawing Sheets

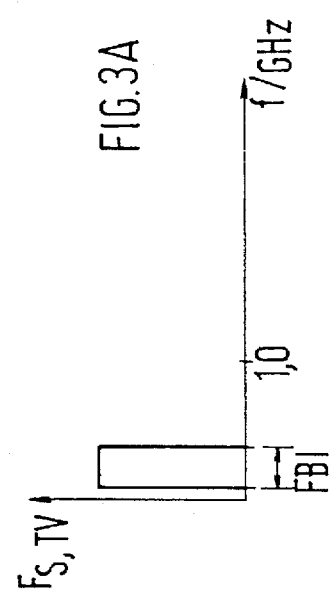
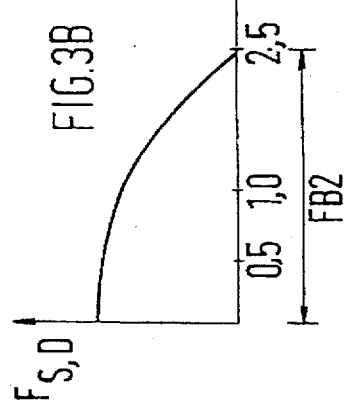
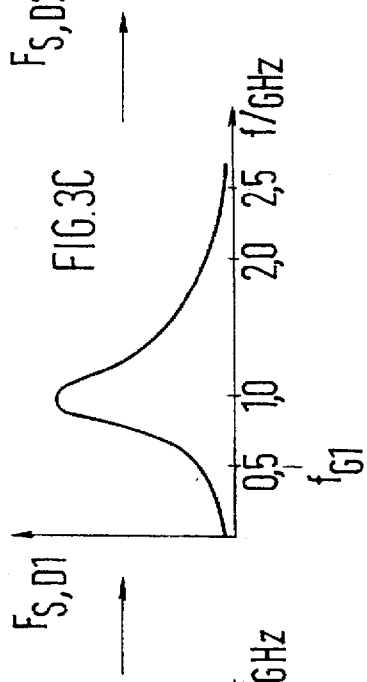
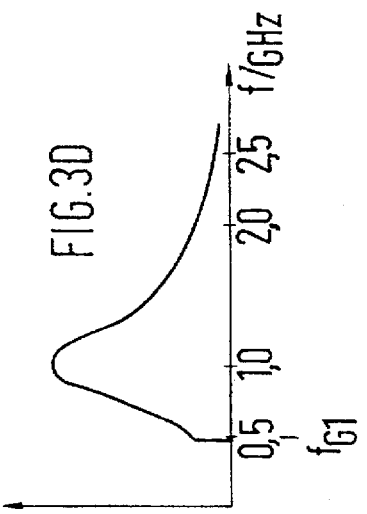
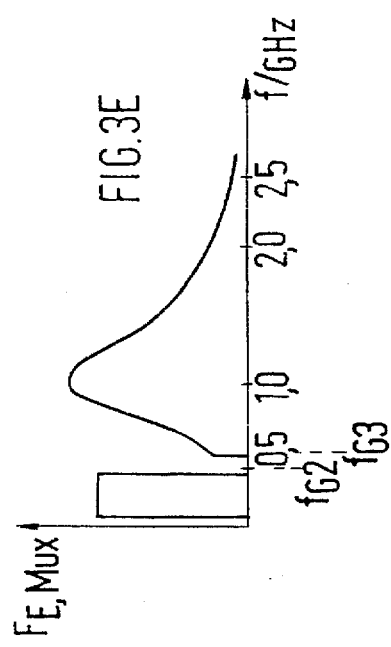

OPTICAL COMMUNICATION SYSTEM FOR CABLE-TELEVISION SIGNALS AND FOR SUBSCRIBER-ASSIGNED SIGNALS

TECHNICAL FIELD

The present invention relates to an optical communication system having first means for converting a first electric signal in a first frequency band to a first optical signal and having a second means for converting a second electric signal in a second frequency band and having a coupling device for coupling the optical signals into an optical fiber network.

BACKGROUND OF THE INVENTION

Such a communication system is known from L. Adnet et al, "Optoelektronik in der Teilnehmeranschlußleitung", Elektrisches Nachrichtenwesen (Alcatel), 4th Quarter 1992, pages 58–65. The system described there has a narrow-band subsystem and a broadband subsystem and serves to distribute cable-television signals to a plurality of subscribers and to permit the transmission of subscriber-assigned telecommunication signals between the subscribers with the aid of the public telephone network. In the narrow-band subsystem, the subscriber-assigned telecommunication signals are transmitted between a network access node and an optical network termination over a passive optical network using time-division multiplexing, the optical network termination being located in the basement of a building and connected to a group of subscribers. The optical network termination has an electrooptical module which converts the received optical signal to an electric signal. In this narrow-band subsystem, the optical signal is transmitted with light of a wavelength of 1300 nm.

In the broadband subsystem, the cable-television signals are transmitted by a higher-ranking repeater station in which a video multiplex signal is converted directly to an optical signal and transmitted via a passive optical network to an optical network termination (BONT) which converts the optical signal back to an electric signal corresponding to the current television standard. Connected to the optical network termination, which is also located in the building's basement, is a group of subscribers. Unlike in the narrow-band subsystem, the cable-television signals are transmitted with light of a wavelength of 1550 nm. This enables the optical signals of the narrow-band subsystem and those of the broadband subsystem to be transmitted over a common passive optical network using wavelength-division multiplexing.

The system composed of these two subsystems thus requires two optical network terminations in each building for converting the respective optical signals back to electric signals. EP-A-0 386 482 discloses an optical communication system for the subscriber area in which at the center an electric frequency-division multiplex signal is formed from television signals and subscriber-assigned signals and converted by an electrical-to-optical transducer to an optical signal. This optical signal is transmitted over optical fiber waveguides to the subscribers. Each subscriber has an optical-to-electrical transducer which converts the optical signal to the electric frequency-division multiplex signal. In a subsequent frequency-dividing network, the television signals and the subscriber-assigned signals are separated.

DISCLOSURE OF INVENTION

It is the object of the invention to provide an optical communication system which requires only one optical network termination in each building, so that the costs in the subscriber area are reduced.

According to the present invention, an optical communication system comprising a first transmitting device for converting a first electric signal having a spectrum which lies in a first frequency band to a first optical signal, a second transmitting device for converting a second electrical signal having a spectrum in a second frequency band to a second optical signal, and a coupling device for coupling the optical signals into an optical fiber network having at least one optical network termination connected thereto, is characterized in that the second transmitting device comprises means for processing the second electric signal for concentrating the energy of the second electric signal on a subband of the second frequency band, which is different from the first frequency band, and that the optical network termination comprises an optical-to-electrical transducer which converts the received optical signals to an electric multiplex signal, and separating and processing means which recover the first and second electric signals from the electric multiplex signal.

One advantage of the invention is that existing cable-television distribution systems can be retrofitted successively as required. In the system disclosed in EP-A-0 386 482, this is only possible at high cost. If occupants of a building wish to avail themselves of individual subscriber services, it suffices to equip this building with corresponding devices. The remainder of the cable-television system and the other buildings are not affected by this measure.

These and other objects, features and advantages of the present invention will become more apparent in light of the detailed description of a best mode embodiment thereof, as illustrated in the accompanying drawing.

BRIEF DESCRIPTION OF THE DRAWING

FIG. 3 shows exemplary spectral functions of electric signals.

BEST MODE FOR CARRYING OUT THE INVENTION

Figure 1:
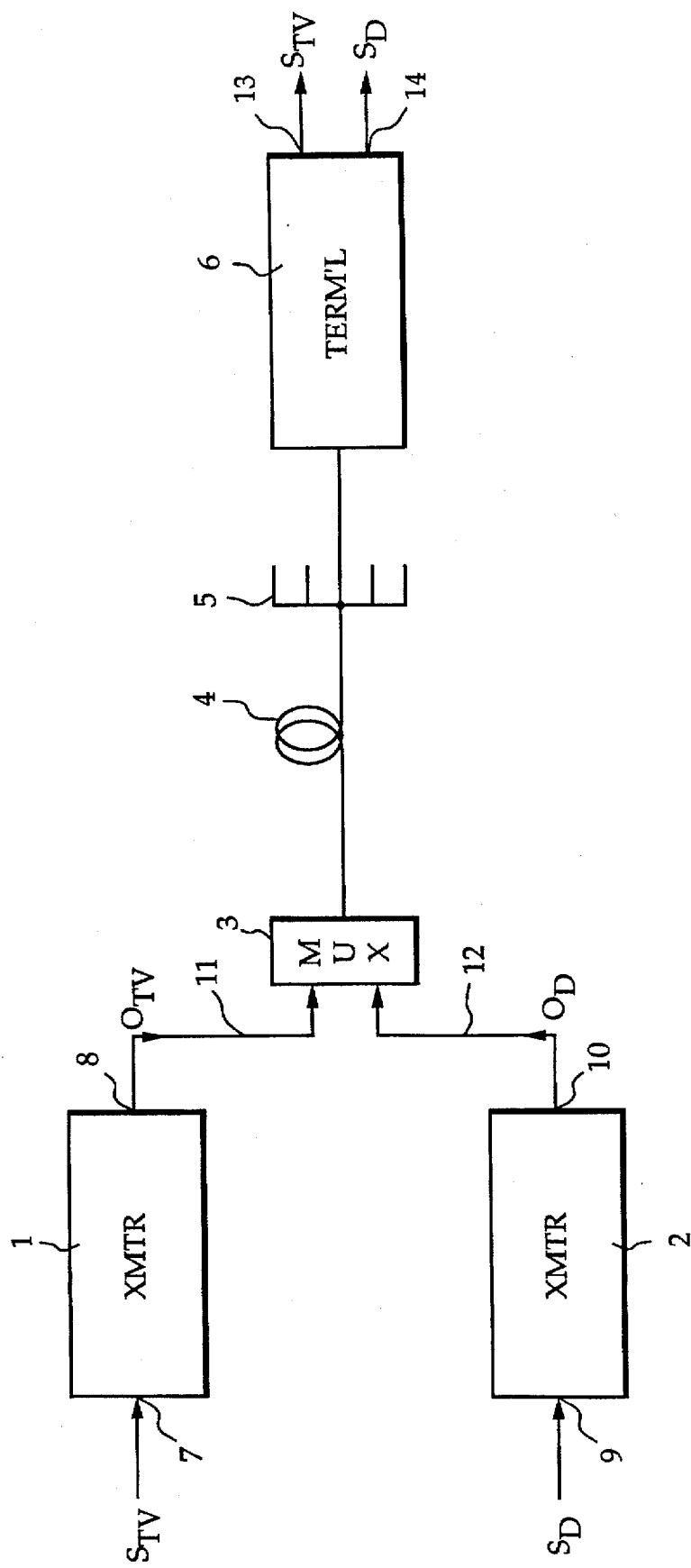
FIG. 1 shows schematically an optical communication system.

FIG. 1 shows schematically an optical communication system. The figure shows two transmitting devices 1, 2, which may be located at a center, for example. They may also be at different locations. In the first transmitting device 1, a first electric signal $S_{TV}$ is converted to a first optical signal $O_{TV}$. In the embodiment shown, such an electric signal $S_{TV}$ is an analog cable-television signal. In the second transmitting device 2, a second electric signal $S_D$ is converted to a second optical signal $O_D$. In this embodiment, such a second electric signal $S_D$ is a digital time-division multiplex signal consisting of subscriber-assigned telecommunication signals. Each subscriber is assigned at least one time slot. The optical signals $O_{TV}$, $O_D$ from the transmitting devices 1, 2 are transmitted from the center, for example, to a plurality of subscribers over an optical distribution network 4, 5 using wavelength-division multiplexing. Connected to the optical distribution network 4, 5 are a number of optical network terminations 6, in which the optical signals $O_{TV}$, $O_D$ are converted back to electric signals $S_{TV}$, $S_D$. Connected to each optical network termination 6 is a group of subscribers which can receive cable-television signals and request individual subscriber services. To simplify the figure, only one optical network termination 6 having two outputs 13, 14 is shown. The first output 13 provides the cable-television signal $S_{TV}$, which is routed over coaxial cables to individual television sets of the subscribers. The second output 14 provides the second electric signal $S_D$, which is also routed over coaxial cables to the subscriber terminals. Each subscriber terminal has a demultiplexer by which only the telecommunication signal intended for this subscriber is withdrawn from the time-division multiplex signal. The cable-television signal $S_{TV}$ is applied to the first transmitting device 1 via an input 7 and appears as the first optical signal $O_{TV}$ at the output 8 of this device. This optical signal $O_{TV}$ has a wavelength of 1550 nm, for example, and is fed to a wavelength-division multiplexer 3 via a first optical fiber waveguide. The second electric signal $S_D$ is applied to the second transmitting device 2 via an input 9 and appears as the second optical signal $O_D$ at an output 10 of this device. This optical signal $O_D$ is fed to the wavelength-division multiplexer 3 via a second optical fiber waveguide 12. It has a wavelength of 1532 nm, for example.

Figure 2:
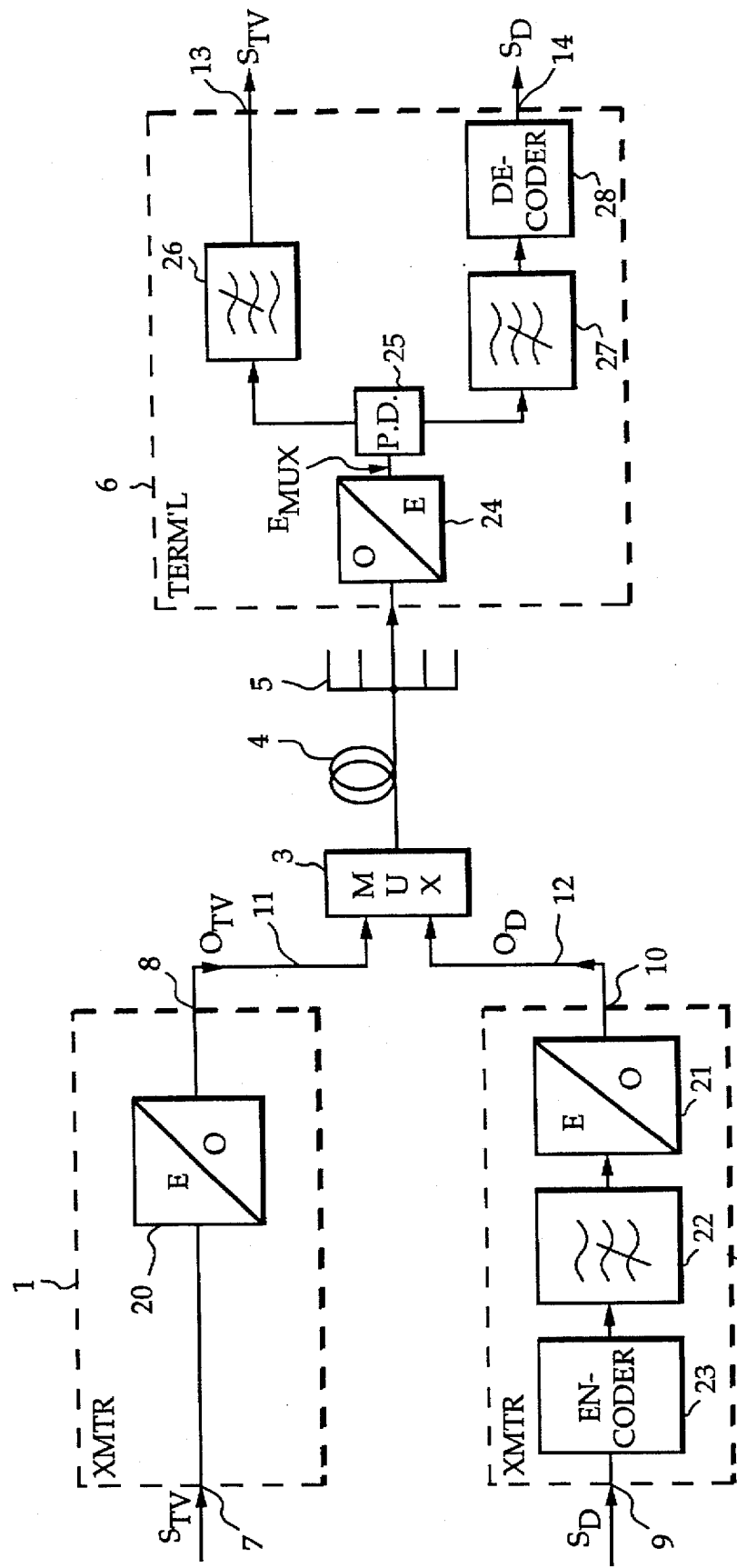
FIG. 2 shows the optical communication system with parts relevant to the invention.

FIG. 2 shows the optical communication system with parts relevant to the invention. The transmitting devices 1, 2 and the optical network termination 6 are shown in greater detail. Parts already mentioned in connection with FIG. 1 are designated in FIG. 2 by the same reference characters. The first transmitting device 1 for the cable-television signal $S_{TV}$ has, as an essential part, an electrical-to-optical transducer 20, e.g., a DFB semiconductor laser, which emits light of the above wavelength of 1550 nm. In this transmitting device 1 and in the second transmitting device 2, any control devices that may be present are not shown.

The second transmitting device 2 for the second electric signal $S_D$ (digital signal) has, as essential parts, means 22, 23 for processing the second electric signal $S_D$ and an electrical-to-optical transducer 21, also a DFB semiconductor laser, which emits light of the above wavelength of 1532 nm. The processing means 22, 23 consist of an encoder 23 and a filtering device 22, which is a high-pass filter. The second electric signal $S_D$ is fed to the encoder 23, which encodes this signal in a given code. One such code is a channel code, e.g., the so-called Miller code, which is known from G. Morgenstern, "Vergleich der Leistungsdichtespektren verschiedener binärer Basisbandsignale", Technischer Bericht, Deutsche Bundespost, 44TBr71, July 1978.

The coded second electric signal $S_D$ is applied to the high-pass filter 22, which rejects frequencies of the second electric signal $S_D$ lower than a predetermined cutoff frequency $f_{G1}$, e.g., $f_{G1}$=500 MHz, of the high-pass filter 22. This coded and high-pass-filtered second electric signal $S_D$ is fed to the second electrical-to-optical transducer 21, which converts it to the optical signal $O_D$.

To be able to receive and evaluate the optical signals $O_{TV}$, $O_D$ transmitted over the optical distribution network 4, 5, the optical network termination 6 contains an optical-to-electrical transducer 24, which converts the received optical signals $O_{TV}$, $O_D$ to an electric multiplex signal $E_{MUX}$, and separating and processing means 25, 26, 27, 28, to which this electric multiplex signal $E_{MUX}$ is applied.

The separating and processing means 25, 26, 27, 28 consist of a power divider 25 which divides the electric multiplex signal $E_{MUX}$ between two branches, a first electric filter 26 in the first branch which rejects frequencies of the electric multiplex signal $E_{MUX}$ higher than a second cutoff frequency $f_{G2}$, a second electric filter 27 in the second branch which rejects frequencies of the electric multiplex signal $E_{MUX}$ lower than a third cutoff frequency $f_{G3}$, and a regenerating and decoding device 28 in the second branch which regenerates the electric signal filtered by the second electric filter 27, and which decodes the second electric signal $S_D$. Instead of the power divider 25 and the electric filters 26, 27, an electric frequency-dividing network of suitable design can be used.

The first electric filter 26 is a low-pass filter with a cutoff frequency $f_{G2}$ of, e.g., 350 MHz. The second electric filter 27 is a high-pass filter with a cutoff frequency $f_{G3}$ of, e.g., 400 MHz. The filters have a slope steepness sufficient to separate the electric signals $S_{TV}$, $S_D$ from the electric multiplex signal $E_{MUX}$.

The principle underlying the optical system shown in FIGS. 1 and 2 will now be explained with the aid of FIG. 3. FIG. 3 shows spectral functions (spectra) F, i.e., the energy distribution of a signal as a function of frequency, of electric modulating signals occurring in the optical system:

FIG. 3a shows the spectral function $F_{S,TV}$ of the first electric signal $S_{TV}$, which occupies a first frequency band FB1 extending from 47 to 300 MHz, and which has a rectangular shape in this case.

FIG. 3b shows the spectral function $F_{S,D}$ of the second electric signal $S_D$, e.g., a digital signal with a bit rate of 2.5 Gb/s. This signal $S_D$ occupies a second frequency band FB2 extending from 0 to 2.5 GHZ.

FIG. 3c shows the spectral function $F_{S,D1}$ of the coded second electric signal, designated here by $S_{D1}$. This signal $S_{D1}$ also occupies the second frequency band FB2 but has an approximately Gaussian shape with a distinct maximum at f=1.0 GHz. The energy of the second electric signal $S_D$ is thus concentrated on a subband centered at f=1.0 GHz.

FIG. 3d shows the spectral function $F_{S,D2}$ of the coded and high-pass-filtered second electric signal, which is designated by $S_{D2}$. This filtered signal $S_{D2}$ has only frequencies of $f_G$=0.500 GHz to 2.5 GHz.

FIG. 3e shows the spectral function $F_{E,MUX}$ of the electric multiplex signal $E_{MUX}$, this spectral function resulting from the superposition of the spectral functions $F_{S,TV}$ and $F_{S,D2}$. The first frequency band FB1 of the first electric signal $S_{TV}$ is clearly separated from the frequency band of the coded and filtered second electric signal $S_{D2}$, so that any interference between the two signals $S_{TV}$, $S_D$ is avoided.

The second electric signal $S_D$ is processed (coded) by the encoder 23 in such a way that its energy is concentrated on a subband of the second frequency band FB2. This corresponds to a shift of the center of the spectral function $F_{S,D}$. The coding is preferably done in such a way that the center of the spectral function $F_{S,D}$ is shifted toward higher frequencies, so that at low frequencies, in comparison with the total energy of the second electric signal $S_D$, only little energy is present (FIG. 3c). These low frequencies are then rejected by the high-pass filter 22, so that in the frequency band from 0 to the cutoff frequency $f_{G1}$ of the high-pass filter 22, the spectral function $F_{S,D2}$ is very much smaller (e.g., 60 dB) than the spectral function $F_{S,TV}$. The spectral function $F_{S,D2}$ can also be nearly zero, however (FIG. 3d). Thus, there is a "free space" in the spectral function $F_{S,D2}$. Since the energy of the second electric signal $S_D$ was concentrated prior to the filtering, only a small part of the energy is lost through the filtering, and the second electric signal $S_D$ can be recovered in the optical network termination 6 with sufficient quality.

In the optical-to-electrical transducer 24, the received optical signals $O_{TV}$ and $O_D$ are converted to the electric multiplex signal $E_{MUX}$ (FIG. 3e). In this multiplex signal $E_{MUX}$, which is only formed in the optical network termination 6, the free space in the spectral function $F_{S,D2}$ is occupied by the spectral function $F_{S,TV}$ of the first electric signal $S_{TV}$.

The numerical values in the description are to be understood as examples. For the application of the principle described, other numerical values and frequency bands are also possible, of course. The first electric signal $S_{TV}$ need not necessarily be an analog cable-television signal. It can also be a further digital signal, for example.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. An optical communication system comprising a first transmitting device (1) for converting a first electric signal ($S_{TV}$), whose spectrum lies in a first frequency band FB1, to a first optical signal ($O_{TV}$), a second transmitting device (2) for converting a second electric signal ($S_D$), whose spectrum lies in a second frequency band (FB2), to a second optical signal ($O_D$), and a coupling device (3) for coupling the optical signals ($O_{TV}$, $O_D$) into an optical fiber network (4, 5) having at least one optical network termination (6) connected thereto, characterized in that the second transmitting device (2) comprises means (22, 23) for processing the second electric signal ($S_D$) for concentrating the energy of the second electric signal ($S_D$) on a subband of the second frequency band (FB2) which is different from the first frequency band (FB1), and that the optical network termination (6) comprises an optical-to-electrical transducer (24), for converting the received optical signals ($O_{TV}$, $O_D$) to an electric multiplex signal ($E_{MUX}$), and separating and processing means (25, 26, 27, 28) for recovering the first and second electric signals ($S_{TV}$, $S_D$) from the electric multiplex signal ($E_{MUX}$).

2. An optical system as claimed in claim 1, characterized in that the means (22, 23) for processing the second electric signal ($S_D$) are for concentrating the spectrum so that frequencies lower than a first cutoff frequency ($f_{G1}$) limiting the subband of the second frequency band (FB2) are rejected.

3. An optical system as claimed in claim 2, characterized in that the means (22, 23) for processing the second electric signal ($S_D$) comprises an encoding device (23), for encoding the second electric signal ($S_D$) in a given code, and a filtering device (22), for rejecting frequencies lower than the first cutoff frequency ($f_{G1}$), and that the separating and processing means (25, 26, 27, 28) comprise a dividing device (25) for dividing the electric multiplex signal ($E_{MUX}$) between two branches, a first electric filter (26) in the first branch for rejecting frequencies of the electric multiplex signal ($E_{MUX}$) higher than a second cutoff frequency ($f_{G2}$), a second electric filter (27) in the second branch for rejecting frequencies of the electric multiplex signal ($E_{MUX}$) lower than a third cutoff frequency ($f_{G3}$), and a regenerating and decoding device (28) in the second branch for regenerating and decoding the signal obtained by filtering the electric multiplex signal ($E_{MUX}$) and for recovering the second electric signal ($S_D$) therefrom.

4. An optical system as claimed in claim 3, characterized in that the electric filter (22) in the second transmitting device (2) is a high-pass filter, that the first electric filter (26) in the optical network termination (6) is a low-pass filter, and that the second electric filter (27) in the optical network termination (6) is a high-pass filter.

5. An optical system as claimed in claim 2, characterized in that the means (22, 23) for processing the second electric signal ($S_D$) comprises an encoding device (23) for encoding the second electric signal ($S_D$) in a given code, and a filtering device (22) for rejecting frequencies lower than the first cutoff frequency ($f_{G1}$), and that the separating and processing means (25, 26, 27, 28) comprise a frequency-branching network for dividing the electric multiplex signal ($E_{MUX}$) between two branches, the first branch containing means for rejecting the frequencies of the electric multiplex signal ($E_{MUX}$) higher than a second cutoff frequency ($f_{G2}$), and a regenerating and decoding device (28) in the second branch, the second branch including means for rejecting frequencies lower than a third cutoff frequency ($f_{G3}$).

6. An optical system as claimed in claim 1, characterized in that the first electric signal ($S_{TV}$) is an analog signal, and that the second electric signal ($S_D$) is a digital signal.

7. An optical system as claimed in claim 6, characterized in that the first electric signal ($S_{TV}$) is an analog cable-television signal.

8. An optical system as claimed in claim 1, characterized in that both electric signals ($S_{TV}$, $S_D$) are digital signals.

9. An optical system as claimed in claim 3, characterized in the code is a channel code.

10. An optical system as claimed in claim 3, characterized in that the first cutoff frequency ($f_{G1}$) is approximately 500 MHz, the second cutoff frequency ($f_{G2}$) approximately 350 MHz, and the third cutoff frequency ($f_{G3}$) approximately 400 MHz.

11. An optical system as claimed in claim 3, characterized in that the first electric signal ($S_{TV}$) is an analog signal, and that the second electric signal ($S_D$) is a digital signal.

12. An optical system as claimed in claim 5, characterized in that the first electric signal ($S_{TV}$) is an analog signal, and that the second electric signal ($S_D$) is a digital signal.

13. An optical system as claimed in claim 3, characterized in that both electric signals ($S_{TV}$, $S_D$) are digital signals.

14. An optical system as claimed in claim 5, characterized in that both electric signals ($S_{TV}$, $S_D$) are digital signals.

15. An optical system as claimed in claim 5, characterized in that the code is a channel code.

16. An optical system as claimed in claim 5, characterized in that the first cutoff frequency ($f_{G1}$) is approximately 500 MHz, the second cutoff frequency ($f_{G2}$) approximately 350 MHz, and the third cutoff frequency ($f_{G3}$) approximately 400 MHz.

* * * * *

UNITED STATES PATENT AND TRADEMARK OFFICE
CERTIFICATE OF CORRECTION

PATENT NO.   : 5,748,348
DATED        : May 5, 1998
INVENTOR(S)  : Rolf Heidemann, et. al.

It is certified that error appears in the above-identified patent and that said Letters Patent is hereby corrected as shown below:

```
Title page, item [56], after line (FOREIGN PATENT DOCUMENTS), insert--
0386482    2/1990    EPO
1566955    2/1971    Germany
```

Signed and Sealed this

Twenty-second Day of September, 1998

Attest:

BRUCE LEHMAN

*Attesting Officer*           *Commissioner of Patents and Trademarks*